(12) United States Patent
Narayanabhatla

(10) Patent No.: US 7,408,901 B1
(45) Date of Patent: Aug. 5, 2008

(54) METHOD AND SYSTEM FOR PREDICTIVE HANDOFF OF A DATA SESSION BETWEEN ENTITIES

(75) Inventor: Shiva Narayanabhatla, Overland Park, KS (US)

(73) Assignee: Sprint Spectrum L.P., Overlamd Park, KS (US)

( * ) Notice: Subject to any disclaimer, the term of this patent is extended or adjusted under 35 U.S.C. 154(b) by 488 days.

(21) Appl. No.: 11/025,416

(22) Filed: Dec. 29, 2004

(51) Int. Cl.
*H04Q 7/00* (2006.01)

(52) U.S. Cl. .................. 370/331; 455/436; 455/438; 455/439; 455/442

(58) Field of Classification Search .......... 455/438, 455/439, 440, 441, 436; 370/328, 331
See application file for complete search history.

(56) References Cited

U.S. PATENT DOCUMENTS

| | | | |
|---|---|---|---|
| 6,230,013 B1 * | 5/2001 | Wallentin et al. | 455/436 |
| 6,389,285 B1 | 5/2002 | Escamilla et al. | 455/438 |
| 6,792,273 B1 * | 9/2004 | Tellinger et al. | 455/442 |
| 7,076,245 B1 | 7/2006 | Satapathy | |
| 2003/0053430 A1 * | 3/2003 | Choi et al. | 370/331 |
| 2004/0176094 A1 * | 9/2004 | Kim et al. | 455/438 |
| 2005/0181794 A1 * | 8/2005 | Rajkotia | 455/436 |

OTHER PUBLICATIONS

Agha, Khaldoun Al, Al-Meshhadany, Thamer, Perato, Laurent, Resouce allocation based on handoff prediction in WCDMA, IEEE, 2002.
Chen, Wen-Tsuen, Lin, Tzu-Min, Lo, Shou-Chih, A dynamic resourece reservation scheme with the hybrid handoff prediction in mobile cellular networks, Nov. 28, 2001.
Lee, Chae Y., Kang, Hyon G., Performance of the double tunneling with handoff prediction in mobile IP network, Jun. 25, 2003.
Hu, Jian-Hao, Feng, Gang, Yeung, Kwan Lawrence, Hierarchical Cache Design for enhancing TCP over heterogeneous networks with wired and wireless links, IEEE transactions on wireless communications, vol. 2, No. 2, Mar. 2003.

* cited by examiner

*Primary Examiner*—Nick Corsaro
*Assistant Examiner*—Sylvia Mack

(57) ABSTRACT

A method and system for managing handoff of a cellular wireless data session between a first wireless coverage area and second wireless coverage area. A first radio network controller (RNC) predicts that handoff of the data session will soon be necessary. Radio resources for continuing the data session in the second wireless coverage area are reserved. The reserved radio resources may be controlled by the first RNC or by a second RNC. The first RNC sends, to a wireless communication device, a predictive handoff directive message that instructs the wireless communication device (i) to wait a designated period of time, and (ii) to then handoff the data session.

12 Claims, 4 Drawing Sheets

METHOD AND SYSTEM FOR PREDICTIVE HANDOFF OF A DATA SESSION BETWEEN ENTITIES

BACKGROUND

1. Field of Invention

The present invention relates to wireless communication devices that participate in wireless data sessions, and more particularly to hand off wireless data sessions from a first entity to a second entity.

2. Description of Related Art

In a cellular wireless data communication system, an area is divided into a plurality of cells, each defined by a radiation pattern from a respective base transceiver station (BTS). Each BTS is in turn coupled with a radio network controller (RNC), and each RNC is then coupled with a gateway such as a packet data serving node (PDSN), which provides connectivity with a packet-switched network such as the Internet. In a typical arrangement, each RNC serves a plurality of BTSs, and each PDSN serves a plurality of RNCs. Further, each cell is typically divided into a plurality of sectors. A wireless communication device may then operate within the coverage area of a given sector and communicate, wirelessly with the BTS and via the RNC and PDSN, with an apparatus on the packet-switched network.

Generally speaking, the RNC functions to manage allocation of radio resources, such as to allocate radio traffic channels for use by wireless communication devices and to manage handoff of wireless communication device communications between coverage areas served by the RNC. Further, the RNC functions as an interface between wireless communication devices and the PDSN, so as to facilitate establishment of packet-data connectivity for wireless communication devices.

Air interface communications between the BTS/RNC and wireless communication devices can comply with various protocols, examples of which include CDMA, TDMA, GSM, and AMPS. This description will focus on CDMA, although it should be understood that the principles described herein can be extended to apply with respect to other air interface protocols as well.

In CDMA, each sector is identified by a unique "PN offset" in a given carrier frequency, and a wireless communication device communicates with its serving BTS on one or more coded traffic channels each identified by a unique "Walsh code." High speed data communications under the emerging 1XEV-DO standard (IS-856) occur within a common traffic channel (i.e., using a common Walsh code), with each wireless communication device being assigned to communicate on a particular TDM time slot in the channel.

To acquire packet-data connectivity, according to IS-856, a wireless communication device first sends to its RNC a packet-data-connectivity request called a UATI (Universal Access Terminal Identifier) request. This is an IP-based message, which passes over an all IP channel between the wireless communication device and the RNC. (For this purpose, the wireless communication device has a local non-routable IP address usable for communications with the RNC.)

Once the RNC receives the UATI request from the wireless communication device, the RNC authenticates the wireless communication device and facilitates assignment of a mobile-IP address for use by the wireless communication device. In particular, the RNC sends an access request to an Access Network AAA (ANAAA) over an $A_{12/13}$ interface, and the ANAAA authenticates the wireless communication device. The RNC then assigns radio resources for the data session, by directing the wireless communication device to operate on a particular TDM time slot in the common data traffic channel on a given carrier frequency. Further, the RNC signals to the PDSN, and the PDSN and wireless communication device then negotiate to establish a point-to-point protocol (PPP) data link connection. In addition, the PDSN signals to a mobile-IP home agent (HA), which assigns a mobile-IP address for the wireless communication device to use, and the PDSN passes that IP address via the RNC to the wireless communication device. Given its radio link (TDM time slot/frequency), data link (PPP link with the PDSN) and IP address, the wireless communication device may then begin communicating with an apparatus on the packet-switched network.

As noted above, one of the functions of the RNC is to manage handoffs of wireless communication device communications between coverage areas. In typical practice, handoff is triggered based on an analysis of the strength of pilot signals that a wireless communication device is receiving from its current serving sector and from adjacent sectors. If the strength of the pilot signal from an adjacent sector exceeds the strength of the pilot signal from the current sector by a threshold level, then handoff will occur. In CDMA, a wireless communication device has an "active set" of sectors in which it operates concurrently. Consequently, handoff may occur when the strength of a pilot signal from an adjacent sector (not in the active set) exceeds the lowest strength of a pilot signal in the active set by a defined threshold level, $T_{ADD}$.

Handoff can be mobile-initiated or network-initiated. In a mobile-initiated handoff system, the wireless communication device regularly analyzes its received signal strength to determine when the strength of a pilot signal from an adjacent sector exceeds the strength of the pilot signal from the current sector by the threshold and, if so, notifies the RNC. The RNC may then responsively direct the wireless communication device to hand off to the new sector. In a network-initiated handoff system, on the other hand, the wireless communication device regularly sends measurements of its received signal strength to the RNC, and the RNC determines when the received signal strength of a pilot signal from an adjacent sector exceeds the received signal strength from a current sector by the threshold and, if so, directs the wireless communication device to hand off to the new sector.

This handoff process is largely seamless when the source and target sectors for the handoff are both within the same RNC serving area. However, difficulty arises when the source and target sectors are served by different RNCs. When that happens, the handoff process contemplated by IS-856 involves releasing the wireless communication device's radio link (TDM time slot) with respect to the first RNC and then forcing the wireless communication device to re-acquire a radio link with respect to the second RNC.

More particularly, when the first RNC detects that the wireless communication device should hand off to a sector served by the second RNC, the first RNC will transition the wireless communication device into a "dormant" state in which the wireless communication device will maintain its data link (PPP session) and IP address but in which it will have no radio link. To do so, (i) the first RNC will signal over a forward link control channel to the wireless communication device, to tell the wireless communication device that the wireless communication device's assigned TDM time slot is being released and that the wireless communication device should operate on the target sector's PN offset instead, (ii) the first RNC will release the assigned TDM time slot, and (iii) the first RNC will signal to the PDSN to direct the PDSN to put the wireless communication device into a dormant state, thereby causing the PDSN to begin buffering any packets that arrive for the wireless communication device.

When the wireless communication device receives the message indicating that it has lost its traffic channel, the wireless communication device will automatically seek to re-acquire packet-data connectivity by sending a UATI message in the target sector. As the target sector is served by the second RNC, the UATI message will then pass to the second RNC. In response, the second RNC will then assign a TDM time slot for use by the wireless communication device.

Further, after the second RNC assigns the TDM time slot, the second RNC can send a signal to the PDSN in response to the UATI message. In order for the second RNC to be able to signal the PDSN, the second RNC needs to know the IP address of the PDSN. The second RNC may learn the IP address of the PDSN in various ways. As an example, the wireless communication device may send the IP address of the PDSN to the second RNC via the assigned TDM time slot for the target sector. As another example, the first RNC may send a message that indicates the IP address of the PDSN to the second RNC prior to handoff of the data session. Other examples of how the second RNC learns the IP address of the PDSN are also possible. After learning the IP address of the PDSN, the second RNC, in response to the UATI message, can signal the PDSN to transition the wireless communication device back to an "active" state.

The transitioning of the wireless communication device's data session from active to dormant and then back to active again, to facilitate a handoff from a first RNC to a second RNC, can disrupt data communications and is generally inefficient. Therefore, an improvement is desired.

SUMMARY

The present invention advances over the existing art by providing a predictive handoff mechanism for handing off a data session. As presently contemplated, an RNC (i) predicts that handoff of a data session will soon be necessary, (ii) causes radio resources for carrying the data session after handoff to be reserved, and (iii) sends to a wireless communication device a predictive handoff directive message that instructs the wireless communication device to wait a designated period of time and to then handoff.

The predictive handoff mechanism is applicable to handing off data sessions between two entities. For instance, handoff of a data session could occur between two RNCs, such as a source RNC and a target RNC. In this regard, (i) the source RNC is currently serving the wireless communication device, and (ii) the target RNC may be able to provide better service (to the wireless communication device in its current or upcoming location) than the source RNC. As another example, handoff of a data session may occur from a first wireless coverage area to a second wireless coverage area. In this regard, a first RNC may control the first wireless coverage area and a second RNC may control the second wireless coverage area, or a single RNC may control both the first wireless coverage area and the second wireless coverage area.

In one respect, an exemplary embodiment of the invention may take the form of a system that includes (i) a base station system that defines a first wireless coverage area and a second wireless coverage area, (ii) a wireless communication device that is operable to communicate wirelessly with the base station system while in the first wireless coverage area and while in the second wireless coverage area, and (iii) an RNC that controls the base station system and that provides connectivity between the base station system and a packet switched network. The wireless communication device is operable to engage in a packet data session via the base station system, the RNC, and a gateway to a packet-switched network. The RNC is operable to predict that handoff of a packet data session from the first wireless coverage area to the second wireless coverage area will soon be necessary. In response to predicting that handoff of the data session will soon be necessary, the RNC (i) reserves target radio resources to carry the data session in the second wireless coverage area, and (ii) sends to the wireless communication device a predictive handoff directive message that instructs the wireless communication device to wait a designated period of time and to then handoff to the second wireless coverage area.

In another respect, the exemplary embodiment may take the form of a system that includes (i) a source RNC, (ii) a target RNC communicatively coupled to the source RNC, and (iii) a wireless communication device that is operable to establish a data session via the source RNC. The source RNC is operable to predict that handoff of the data session to the target RNC will soon be necessary. In response to predicting that handoff to the target RNC will soon be necessary, the source RNC (i) sends a signal to the target RNC to cause the target RNC to reserve radio resources for the data session, and (ii) sends to the wireless communication device a predictive handoff directive message that instructs the wireless communication device to wait a designated period of time and to then handoff to the target RNC.

In yet another respect, the exemplary embodiment could take the form of a method for managing handoff of a data session between two radio network controllers. In this regard, the method includes (i) predicting at a source RNC that handoff of the data session to a target RNC will soon be necessary, (ii) sending a signal from the source RNC to the target RNC to cause the target RNC to reserve radio resources for the data session, and (iii) sending to a wireless communication device a predictive handoff directive message that instructs the wireless communication device to wait a designated period of time and to then handoff to the target RNC.

In still yet another respect, the exemplary embodiment could take the form of a method for managing handoff of a data session between two wireless coverage areas served by a single RNC. In this regard, the method includes (i) predicting at an RNC that handoff of the data session from a first wireless coverage area to a second wireless coverage area will soon be necessary, (ii) reserving radio resources at the RNC for carrying the data session in the second wireless coverage area, and (iii) sending to a wireless communication device a predictive handoff directive message that instructs the wireless communication device to wait a designated period of time and to then handoff to the RNC.

Advantageously, by (i) reserving radio resources in advance, based on a prediction that handoff is likely to occur, and (ii) directing a wireless communication device to wait a designated period of time and to then hand off, hand off between two entities can occur more seamlessly.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

Figure 1:
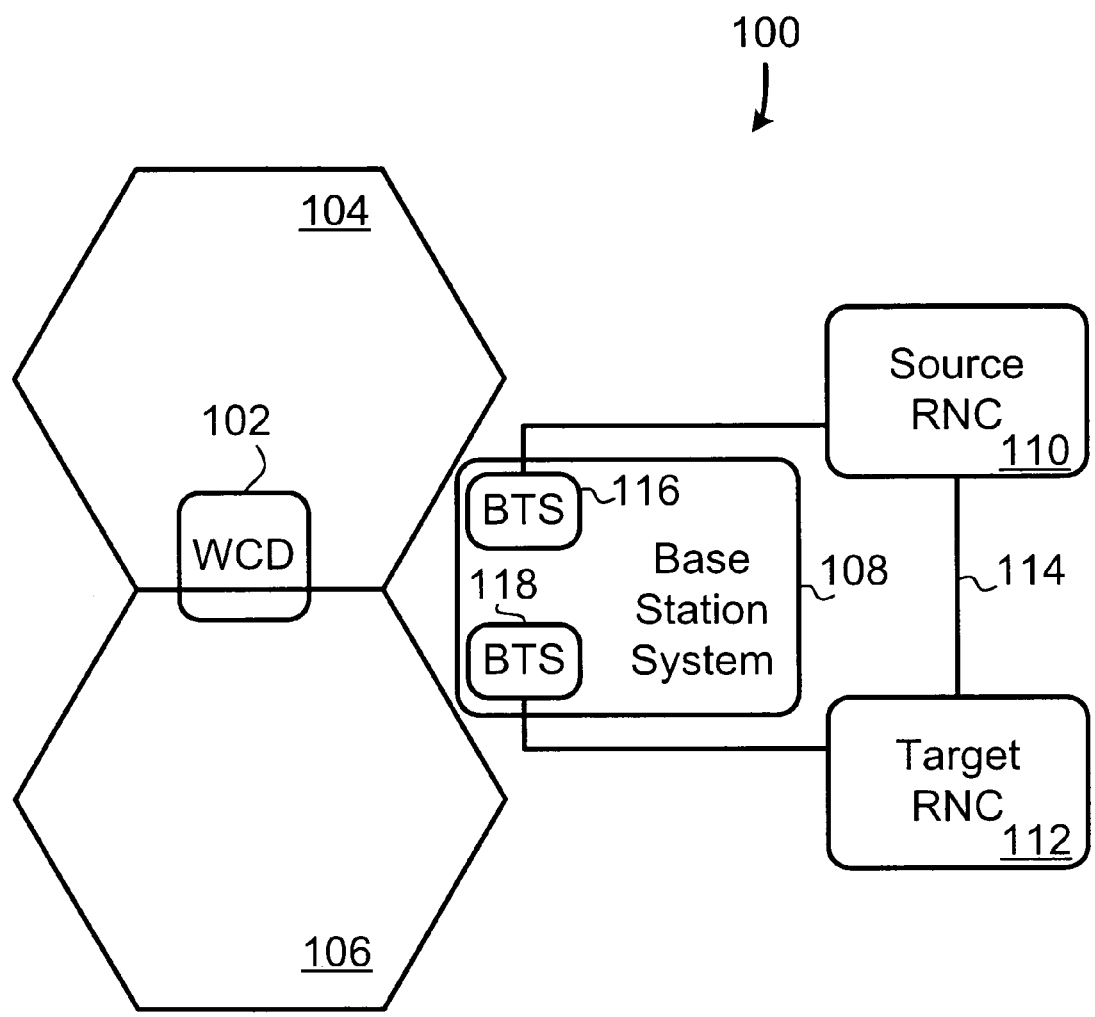
FIG. 1 is a block diagram of a communication system in which an exemplary embodiment can be implemented.

The present invention provides a mechanism for predictive handoff of a wireless data session between two entities. The predictive handoff mechanism involves a radio network controller (RNC) that makes a prediction that handoff of a data session from a first entity to a second entity will soon be necessary. After the RNC makes the prediction, the RNC responsively (i) causes radio resources for the data session to be reserved, and (ii) sends a predictive handoff directive message to a wireless communication device. A predictive handoff directive message instructs the wireless communication device to wait a designated period of time and to then handoff. After handoff of the data session to the second entity, the data session may continue via the second entity.

As noted above, a predictive handoff directive message is sent to a wireless communication device after the RNC makes a prediction that handoff of a data session will soon be necessary. Making the prediction involves detecting that a predictive handoff threshold has been surpassed. In this regard, the predictive handoff threshold indicates that handoff may soon be necessary. Predicting that handoff may soon be necessary provides time, before handoff of the data session actually becomes necessary, in which (i) radio resources of a target entity may be reserved, (ii) a wireless communication device may be notified that handoff of the data session may soon be necessary, and (iii) the wireless communication device may prepare for data session handoff.

Generally speaking, the process of handing off a data session may be characterized as handing off between two wireless coverage areas. Examples of wireless coverage areas include a wireless network cell or a sector within a wireless network cell. A wireless coverage area may be served by one or more network entities. Examples of the one or more network entities that serve a wireless coverage area include an RNC, a BTS, and a PDSN. Further, the process of handing off a data session may be characterized as handing off from one or more network entities that serve a first wireless coverage area to one or more network entities that serve a second wireless coverage area.

2. Exemplary Architecture

A first exemplary embodiment of the present invention in the form of a system includes (i) a source RNC, (ii) a target RNC that is communicatively coupled to the source RNC, and (iii) a wireless communication device that is operable to establish a data session via the source RNC. In this exemplary embodiment, the source RNC makes a prediction that handoff of the data session from the source RNC to the target RNC will soon be necessary. In response to making the prediction, the source RNC (i) sends to the target RNC a signal that causes the target RNC to reserve radio resources for carrying the data session after handoff, and (ii) sends to the wireless communication device a predictive handoff directive message that instructs the wireless communication device to wait a designated period of time and to then handoff.

The first exemplary embodiment may be implemented as a system 100 shown in FIG. 1. The system 100 includes a wireless communication device 102, a first wireless coverage area 104, a second wireless coverage area 106, a base station system 108, a source RNC 110, a target RNC 112, and a trunk line 114 that couples the source RNC 110 to the target RNC 112.

The wireless communication device 102 may be arranged as a mobile wireless communication device or a fixed wireless communication device. A mobile wireless communication device is operable (i) as the device is moved within a single wireless coverage area, and (ii) as the device is moved from one wireless coverage area to another. A fixed wireless communication device, on the other hand, operates at a fixed location. In this regard, for instance, the fixed location may be (i) a location in the first wireless coverage area 104 such that the fixed wireless communication device 102 does not receive any signals from the second wireless coverage area 106, or (ii) a location such that the fixed wireless communication device 102 receives signals emanating from both the first wireless coverage area 104 and the second wireless coverage area 106. Examples of the wireless communication device 102 that are mobile include (i) a handheld device, such as a cellular phone or personal digital assistant (PDA), or (ii) a cellular phone integrated into a motor vehicle. An example of a fixed wireless communication device is a device, such as a wireless local loop hub, that draws its power from electrical outlets at a fixed location and is not operable if the device is not coupled to the electrical outlets. Other examples of the wireless communication device 102 as a mobile device or as a fixed device are also possible.

The base station system 108 provides radio resources to provide the first wireless coverage area 104 and the second wireless coverage area 106. As an example, the radio resources may include one or more traffic channels for carrying a data session. In particular, the radio resources may be associated with a given carrier frequency and/or a code, such as a Walsh code according to the CDMA protocol. Other examples of the radio resources are also possible.

The base station system 108 includes a first BTS 116 to produce the first wireless coverage area 104. The first BTS 116 provides radio resources for the first wireless coverage area 104 and is communicatively coupled to the source RNC 110. The base station system 108 includes a second BTS 118 to produce the second wireless coverage area 106. The second BTS 118 provides radio resources for the second wireless coverage area 106 and is communicatively coupled to the target RNC 112. The base station system 108 may include one or more other BTSs, in addition to the first BTS 116 and the second BTS 118, that are coupled to the source RNC 110 or to the target RNC 112.

The first BTS 116 provides a source pilot signal. The second BTS 118 provides a target pilot signal. The wireless communication device 102 may detect the strength of both the source pilot signal and the target pilot signal (i) while the wireless communication device 102 is in the first wireless coverage area 104, (ii) while the wireless communication device 102 is in the second wireless coverage area 106, and (iii) while the wireless communication device is in both the first wireless coverage area 104 and the second wireless coverage area 106. The strength of the source pilot signal, as measured by the wireless communication device 102, depends, at least in part, on the location of the wireless communication device 102 in relation to the location of the first BTS 116. The strength of the target pilot signal, as measured by the wireless communication device 102, depends, at least in part, on the location of the wireless communication device 102 in relation to the location of the second BTS 118.

The source RNC 110 performs a variety of functions. The source RNC 110 manages a portion of the radio resources provided by the base station system 108. As an example, the source RNC 110 manages the radio resources provided by the first BTS 116. The source RNC 110 participates in handing off a data session between the source RNC 110 and the target RNC 112. The source RNC 110 also functions as an interface between the wireless communication device 102 and a gateway, such as a packet data serving node (PDSN) (not shown), to facilitate establishment of packet-data connectivity for the wireless communication device 102. Other examples of source RNC functions, particular to the mechanism for predictive handoff of a data session, are discussed below.

The target RNC 112 performs a variety of functions. The target RNC 112 manages a portion of the radio resources provided by the base station system 108. As an example, the target RNC 112 manages the radio resources provided by the second BTS 118. The target RNC 112 participates in handing off a data session between the source RNC 110 and the target RNC 112. The target RNC 112 also functions as an interface between the wireless communication device 102 and the gateway (PDSN) to facilitate the wireless communication device reestablishing packet-data connectivity after handoff of the data session from the source RNC 110 to the target RNC 112. Other examples of target RNC functions, particular to the mechanism for predictive handoff of a data session, are discussed below.

The wireless communication device 102 may establish a packet data session via the source RNC 110. After establishing a packet data session via the source RNC 110, the source RNC 110 may predict that handoff of the data session from the source RNC 110 to the target RNC 112 will soon be necessary. As an example, the source RNC 110 may make the prediction as the wireless communication device 102 is moved from the first wireless coverage area 104 to the second wireless coverage area 106.

In order to make the prediction that handoff of the data session from the source RNC 110 to the target RNC 112 will soon be necessary, a determination is made as to whether the strength of the target pilot signal received at the wireless communication device 102 exceeds the strength of the source pilot signal received at the wireless communication device 102 by at least a predictive threshold. Other prediction mechanisms, based on these factors for instance, can be used as well or instead. In one instance, the source RNC 110 makes the determination and then makes the prediction that handoff will soon be necessary based at least in part on the determination. In another instance, the wireless communication device 102 may make the determination and notify the source RNC 110 of the determination. In this regard, the source RNC 110 may make the prediction, based at least in part on the determination, after learning of the determination made by the wireless communication device 102.

As noted above, the source RNC 110 may make the determination. In this regard, the source RNC may include (i) a processor (e.g. one or more processors, such as a general purpose processor and/or a digital signal processor), and (ii) data storage for storing the predictive threshold and program instructions executable by the processor. As an example, the predictive threshold may include data that indicates a particular power value, such as 0.01 Watts.

Further, as noted above, the wireless communication device 102, may make the determination. In this regard, the wireless communication device 102 may include (i) a processor, (ii) data storage for storing the predictive threshold and program instructions executable by the processor, (iii) circuitry for receiving the source pilot signal and the target pilot signal, and (iv) an interface for sending to the source RNC 110 a signal that indicates the determination was made.

The program instructions stored in data storage, at the source RNC 110 or the wireless communication device 102, may include instructions for (i) comparing a strength of the target pilot signal as received at the wireless communication device 102 to a strength of the source pilot signal as received at the wireless communication device 102, and (ii) making a determination that the strength of the target pilot signal received at the wireless communication device 102 exceeds the strength of the source pilot signal received at the wireless communication device 102 by at least the predictive threshold stored in the data storage.

The source RNC 110 includes a first communication interface and the target RNC 112 includes a second communication interface. The first communication interface may be coupled to the second interface via the trunk line 114. The trunk line 114 allows for IP based communication between the source RNC 110 and the target RNC 112. The source RNC 110 may request the target RNC 114 to reserve the radio resources for the data session by sending an IP based signal through the trunk line 114 to the target RNC 112. In this regard, the IP based signal may include information that allows the target RNC 114 to reserve radio resources for the wireless communication device 102. As an example, the information may include an IP address assigned to the wireless communication device 102.

Various radio resources may be reserved at the target RNC 112 for carrying the data session after handoff. As an example, the radio resources may include a traffic channel for carrying the data session. As a more particular example, the radio resources may include a time division multiplex (TDM) timeslot for carrying the data session. As yet another more particular example, the radio resources may include a specific Walsh code assigned for the traffic channel to carry the data session. Other examples of the radio resources that may be reserved for carrying the data session after handoff are also possible.

A second exemplary embodiment of the present invention in the form of a system includes (i) a base station system that defines a first wireless coverage area and a second wireless coverage area, (ii) a wireless communication device that communicates wirelessly with the base station system while the wireless communication device is in the first wireless coverage area and while in the second wireless coverage area, and (iii) an RNC that controls the base station system and provides connectivity between the base station system and a packet switched network.

In the second exemplary embodiment, the wireless communication device may engage in a packet data session via the base station system and the RNC. The packet data session may occur between the wireless communication device and an apparatus on a packet-switched network. The RNC (i) assigns radio resources for carrying the data session prior to handoff, (ii) reserves radio resources for carrying the data session after handoff of the data session, and (iii) provides the radio resources (previously reserved) for the carrying the data session after handoff.

Figure 2:
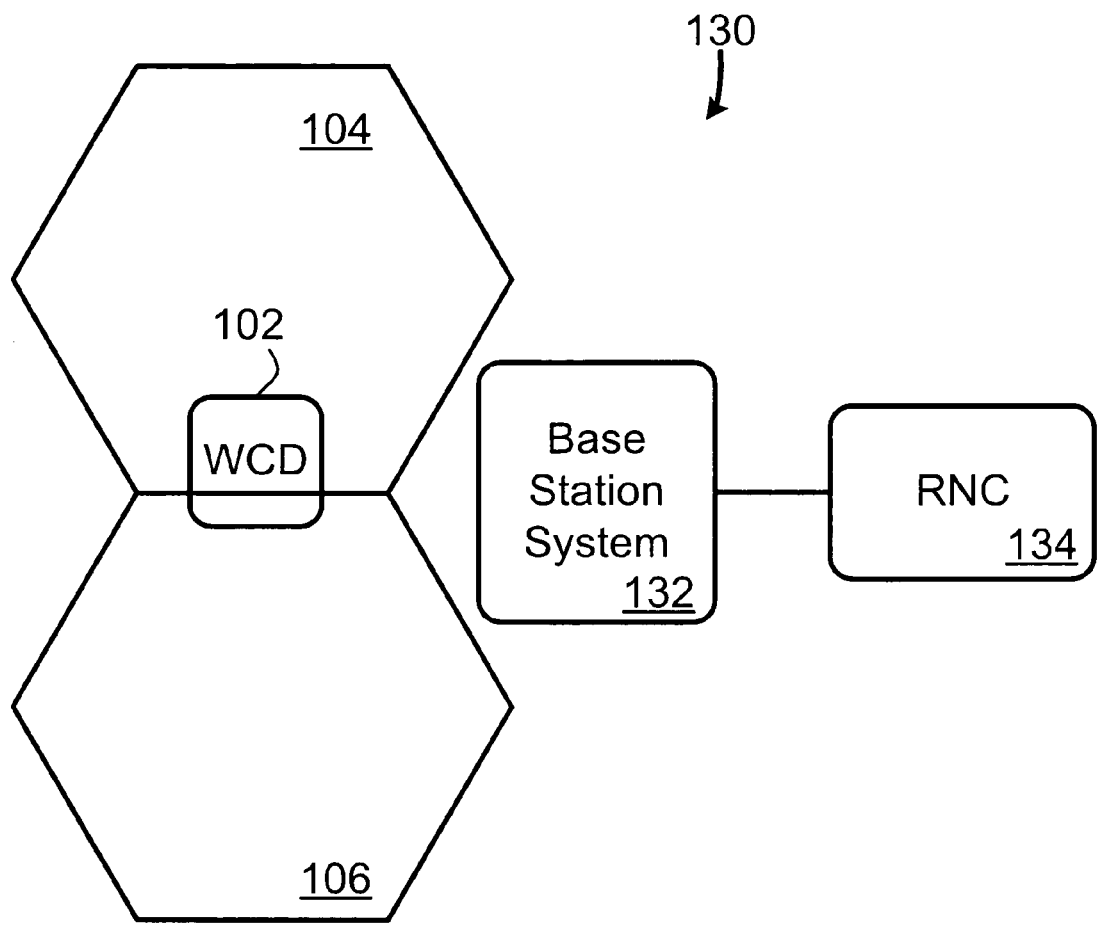
FIG. 2 is a block diagram of another communication system in which an exemplary embodiment can be implemented.

The second exemplary embodiment may be implemented as a system 130 shown in FIG. 2. The system 130 includes the wireless communication device 102, the first wireless coverage area 104, the second wireless coverage area 106, a base station system 132, and an RNC 134. The base station system 132 is communicatively coupled to the RNC 134.

The base station system 132 provides radio resources via one or more base transceiver stations (BTSs) to produce the first wireless coverage area 104 and the second wireless coverage area 106. The base station system 132 provides a first pilot signal for the first wireless coverage area 104 and a second pilot signal for the second wireless coverage area 106.

By way of example, the base station system 132 may include a BTS that includes two or more directional antennas that each provide an individual wireless coverage area in the form of a sector. In this regard, (i) a first directional antenna at the BTS may produce the first wireless coverage area 104 in the form of a first sector, and (ii) a second directional antenna at the BTS may produce the second wireless coverage area 106 in the form of a second sector.

Alternatively, and by way of example, the base station system 132 may include (i) a first BTS having a first omni-directional antenna, and (ii) a second BTS having a second omni-directional antenna. In this regard, the first BTS may produce the first wireless coverage area 104 by radiating signals outward away from the first omni-directional antenna and the second BTS may produce the second wireless coverage area 106 by radiating signals away from the second omni-directional antenna. In this example, the first wireless coverage area 104 and the second wireless coverage area 106 are each arranged in the form of a wireless communication system cell. Other examples of the base station system 132 forming the first wireless coverage area 104 and the second wireless coverage area 106 are also possible.

The RNC 134 performs a variety of functions. For example, the RNC 134 manages the radio resources provided by the base station system 132. As another example, the RNC 134 manages handoff of data sessions between the first wireless coverage area 104 and the second wireless coverage area 106. As yet another example, the RNC 134 functions as an interface between the wireless communication device 102 and a gateway, such as a PDSN, to facilitate establishing packet-data connectivity for the wireless communication device 102. Other examples of RNC functions, particular to the mechanism for predictive data session handoff, are discussed below.

The RNC 134 predicts when handoff of a data session from the first wireless coverage area 104 to the second wireless coverage 106 area will soon be necessary. As an example, the RNC 132 may predict that hand off of the data session will soon be necessary as the wireless communication device 102 is moved into the second wireless coverage area 106 from the first wireless coverage area 104.

Predicting that handoff will soon be necessary involves the RNC 134 making a determination (or the wireless communication device 102 making the determination and sending the RNC 134 notice of the determination) that the strength of the second pilot signal as received by the wireless communication device 102 exceeds the strength of the first pilot signal as received by the wireless communication device 102 by at least the predictive threshold. The RNC 134 will make the prediction that handoff will soon be necessary based at least in part on the determination.

In response to predicting that handoff will soon be necessary, the RNC 134 (i) reserves radio resources to carry the data session in the second wireless coverage area 106, and (ii) sends to the wireless communication device 102 a predictive handoff directive message that instructs the wireless communication device 102 to wait a designated period of time and to then handoff to the second wireless coverage area.

3. Exemplary Operation

Figure 3:
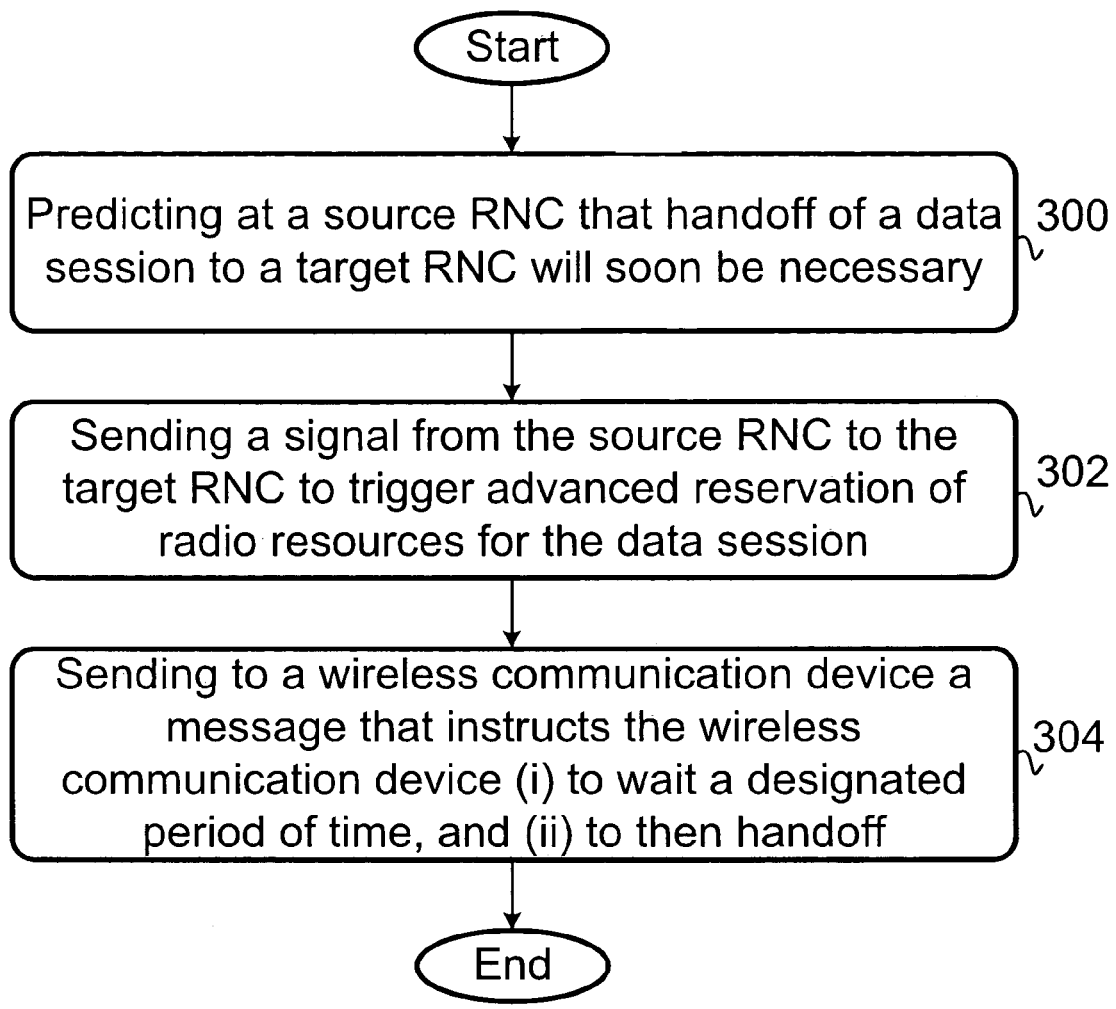
FIG. 3 is a flow chart depicting a set of functions that can be carried out in accordance with an exemplary embodiment.

FIG. 3 is a flow chart depicting a method arranged in accordance with an exemplary embodiment of the invention. As shown in FIG. 3, at block 300, the method involves predicting at a source RNC that handoff of a data session to a target RNC will soon be necessary. In this regard, handoff of the data session from the source RNC to a target RNC is an inter-RNC handoff.

The data session to be handed off may be a cellular wireless data session carried out by a wireless communication device. The wireless data session may involve the wireless communication device establishing packet-data connectivity with an apparatus, such as a network server, in a packet-switched network via a PDSN and the source RNC. The wireless data session may follow the point-to-point protocol (PPP) or any other protocol available for carrying out a wireless data session.

The source RNC serves a first wireless coverage area and controls a first BTS that produces a first pilot signal. The target RNC serves a second wireless coverage area and controls a second BTS that produces a second pilot signal. The wireless communication device can detect the strength of the first pilot signal and the strength of the second pilot signal.

Predicting that handoff of the data session will soon be necessary involves making a determination that the wireless communication device is receiving the second pilot signal at a strength that exceeds the strength of the first pilot signal (as received by the wireless communication device) by at least a predictive threshold. Various methods may be used to make the determination that the strength of the second pilot signal exceeds the strength of the first pilot signal by at least the predictive threshold. As an example, after receiving the first pilot signal and the second pilot signal and determining the strength of the first pilot signal and the strength of the second pilot signal, the wireless communication device sends to the source RNC a signal that indicates the strength of the first pilot signal and the strength of the second pilot signal. Then, the source RNC (i) calculates the difference between the strength of the first pilot signal and the strength of the second pilot signal, (ii) and makes the determination by comparing the difference to the predictive threshold. Thereafter, the source RNC makes the prediction that handoff will soon be necessary based at least in part on the determination.

As another example, after receiving the first pilot signal and the second pilot signal at the wireless communication device, the wireless communication device calculates the difference between the strength of the first pilot signal and the strength of the second pilot signal. Thereafter, the wireless communication device compares the difference to the predictive threshold to make the determination and then sends to the source RNC a signal that indicates the determination has been made. Thereafter, the source RNC may make the prediction that handoff will soon be necessary based at least in part on the determination.

At block 302, the method then involves sending a signal from the source RNC to the target RNC to trigger advanced reservation of radio resources for the data session. The signal that triggers the advanced reservation of radio resources may take various forms. For example, the signal may comprise an Internet-Protocol (IP) based signal that is transmitted over an IP interface. The signal may include various types of information. For example, the signal may include information sufficient to allow the target RNC to identify the wireless communication device. In this regard, the signal may include identifying information, such as (i) an IP address assigned to the wireless communication device, (ii) an International Mobile Subscriber Identity (IMSI) for the wireless communication device, and (iii) a Mobile Identification Number (MIN) for the wireless communication device. As another example, the signal may include information that indicates the amount of radio resources required/desired for the data session. As yet another example, the signal may include information that indicates how many blocks of data have been transmitted to/from the wireless communication device and how many remain to be transmitted to/from the wireless communication device. Other examples of information included in the signal are also possible.

The target RNC may perform various acts in response to receiving the signal that triggers advance reservation of radio resources. First, the target RNC, in response to receiving the signal, may reserve radio resources for carrying the data session. Various methods could be used to reserve the radio resources at the target RNC. For example, reserving the radio resources may involve the target RNC reserving a traffic channel for use by the wireless communication device in a target sector in a wireless coverage area served by the target RNC. In this regard, reserving the traffic channel may involve reserving a TDM timeslot for use by the wireless communication device in a target sector. Other examples of the target RNC reserving radio resources are also possible.

The target RNC may also respond to receiving the signal that triggers advance reservation of radio resources by sending an acknowledgement message to the source RNC. The acknowledgement message may provide the source RNC with a variety of information so that the source RNC can instruct the wireless communication device to hand off. For instance, the acknowledgement message may indicate that the target RNC has reserved the radio resources. In particular, the acknowledgement message may indicate a particular TDM timeslot on a particular carrier frequency that has been reserved for use by the wireless communication device on a target sector. As another example, the acknowledgement message may indicate that the target RNC will reserve the radio resources after a given time period or that the target RNC will reserve the radio resources at a given time. Other examples of the information provided to the source RNC by the acknowledgement message are also possible.

At block 304, the method next involves sending to a wireless communication device a message that instructs the wireless communication device (i) to wait a designated period of time, and (ii) to then handoff. The message sent to the wireless communication device is a predictive handoff directive message. The predictive handoff directive message instructs the wireless communication device to handoff to the radio resources that have been reserved by the target RNC. The source RNC may send the message to a BTS, for transmission in turn, to the wireless communication device on a forward link control channel. Further, the source RNC may send the message to the BTS, for transmission in turn to the wireless communication device, in response to the source RNC receiving the acknowledgement message from the target RNC.

The wireless communication device may act in various ways in response to receiving the predictive handoff directive message from the source RNC. First, the wireless communication device will wait the designated period of time and then handoff the data session to the target RNC. Second, the wireless communication device will stop sending to the source RNC data for the data session. In this regard, the wireless communication device may, in response to receiving the message, stop sending data to the source RNC for the data session immediately. Alternatively, for example, the wireless communication device may stop sending data to the source RNC after waiting the designated period of time (just prior to hand off of the data session). Other examples of how the wireless communication device acts in response to receiving the predictive handoff directive message are also possible.

After handing off the data session to the target RNC, the wireless communication device will seek to re-acquire packet-data connectivity by sending a UATI message to a base transceiver station, for transmission in turn to the target RNC. The wireless communication device may also provide to the target RNC a signal that indicates an address of the PDSN that was facilitating the data session prior to handoff. In response to learning the address of PDSN and receiving the UATI message, the target RNC will send a signal to the PDSN so that the wireless communication device can reestablish a data link (PPP link) with the PDSN. Thereafter, the wireless communication device can reestablish packet data connectivity with an apparatus on a packet-switched network.

Figure 4:
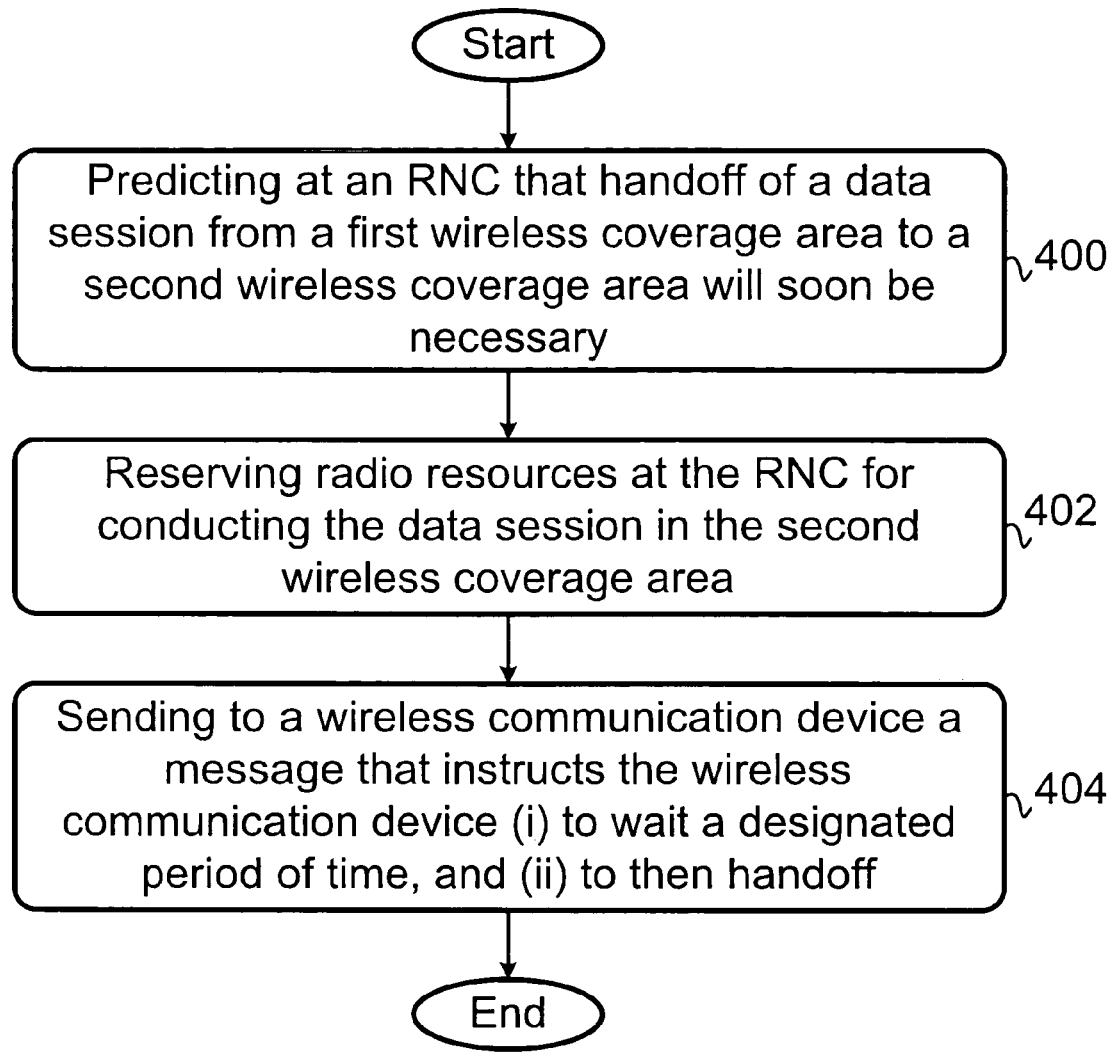
FIG. 4 is a flow chart depicting another set of functions that can be carried out in accordance with an exemplary embodiment.

Next, FIG. 4 is a flow chart depicting another method arranged in accordance with an exemplary embodiment of the invention. As shown in FIG. 4, at block 400, a method for predictive handoff of a wireless data session involves predicting at an RNC that handoff of a data session from a first wireless coverage area to a second wireless coverage area will soon be necessary. According to this exemplary method, the RNC manages radio resources for both the first wireless coverage area and the second wireless coverage area. In this regard, handoff of the wireless data session from the first wireless coverage area to the second wireless coverage area is an intra-RNC handoff since a single RNC manages the radio resources used prior to handoff and the radio resources used after handoff of the wireless data session.

Making the prediction that handoff of the wireless data session will soon be necessary involves (i) the wireless communication device determining a strength of a first pilot signal emanating from the first wireless coverage area and a strength of a second pilot signal emanating from the second wireless coverage area, and (ii) determining if the difference between the strength of the second pilot signal as measured by the wireless communication device and the strength of the first pilot signal as measured by the wireless communication device exceed a predictive threshold. The determining step may take place at the RNC. Alternatively, the determining step may take place at the wireless communication device. If the wireless communication device makes the determination, the wireless communication device notifies the RNC of the determination. The notification may take place by the wireless communication device sending the RNC a message. The RNC makes the prediction that handoff of the wireless data session will soon be necessary based at least in part on the determination.

At block 402, the method then involves reserving radio resources at the RNC for conducting the data session in the second wireless coverage area. Since this method involves an intra-RNC handoff, the RNC does not have to send a signal to a remote RNC to reserve radio resources for handoff of the data session. Instead, reservation of radio resources may occur within the RNC that manages the radio resources for both the first wireless coverage area and the second wireless coverage area. In this regard, the RNC will have knowledge as to what resources are available for use in the second wireless coverage area. For example, the RNC may have a traffic channel available for use by the wireless communication device in the second wireless coverage area. In particular, the RNC may have a specific TDM timeslot and/or a specific Walsh code available for use by the wireless communication device in the second wireless coverage area. Reserving the radio resources at the RNC may involve reserving a traffic channel, and/or a TDM timeslot, and/or a Walsh code for the wireless communication device in the second wireless coverage area. Other examples of reserving radio resources for the wireless communication device in the second wireless coverage area are also possible.

At block 404, the method then involves sending to a wireless communication device a message that instructs the wireless communication device (i) to wait a designated period of time, and (ii) to then handoff. In this regard, the predictive handoff directive message instructs the wireless communication device to handoff a data session to the radio resources that have been reserved for the second wireless coverage area by the RNC.

The RNC sends the predictive handoff directive message to a BTS controlled by the RNC, for transmission in turn to the wireless communication device. The message may be sent to the wireless communication device via a forward link control channel between the BTS and the wireless communication device. The RNC may send the message to the BTS after reserving radio resources that will carry the data session in the second wireless coverage.

The wireless communication device may act in various ways in response to receiving the predictive handoff directive message from the RNC. First, the wireless communication device will wait the designated period of time and then handoff the data session to the radio resources reserved by the RNC. Second, the wireless communication device will stop sending data to the pre-handoff radio resources (the radio resources carrying the data session prior to handoff). In this regard, the wireless communication device may stop sending data to the pre-handoff radio resources immediately in response to receiving the predictive handoff directive message. Alternatively, for example, the wireless communication device may wait the designated period and then stop sending data to the pre-handoff radio resources (just prior to handing off). Other examples of how the wireless communication device acts in response to receiving the predictive handoff directive message are also possible.

After handing off the data session to the second wireless coverage area, the wireless communication device will seek to re-acquire packet-data connectivity by sending a UATI message to a BTS, for transmission in turn to the RNC. The wireless communication device sends the UATI message to the BTS via the radio resources reserved for carrying the data session in the second wireless coverage area. The wireless communication device may also send to a BTS, for transmission in turn to the RNC, an address of the PDSN that was facilitating a packet-data session with an apparatus on a packet-switched network. Alternatively, the RNC may store the address of the PDSN that was facilitating the packet-data session prior to handoff. In this regard, the wireless communication device does not need to send the address of the PDSN to the RNC after handoff. In response to receiving the UATI message and receiving the address of the PDSN (or retrieving the address of the PDSN stored at the RNC), the RNC will signal the PDSN to reestablish the data link between the RNC and the PDSN so that the wireless communication device can reestablish packet data connectivity with an apparatus on a packet-switched network.

4. Conclusion

Exemplary embodiments of the present invention have been described above. Those skilled in the art will understand, however, that changes and modifications may be made to the embodiments described without departing from the true scope and spirit of the present invention, which is defined by the claims.

I claim:
1. A system comprising:
a source radio network controller (RNC);
a target RNC communicatively coupled with the source RNC;
a wireless communication device operable to establish a data session via the source RNC;
a first base transceiver station (BTS) communicatively coupled to the source RNC, wherein the first BTS provides a source pilot signal;
a second BTS communicatively coupled to the target RNC, wherein the second BTS provides a target pilot signal;
a processor at the wireless communication device; and
data storage, at the wireless communication device, that includes a predictive threshold and program instructions executable by the processor,
wherein the wireless communication device is arranged to receive the source and target pilot signals,
wherein the program instructions include instructions for (i) comparing a strength of the target pilot signal received at the wireless communication device to a strength of the source pilot signal received at the wireless communication device, and (ii) making a determination that the strength of the target pilot signal received at the wireless communication device exceeds the strength of the source pilot signal received at the wireless communication device by at least the predictive threshold,
wherein the wireless communication device notifies the source RNC of the determination,
wherein the source RNC makes a prediction that handoff of the data session to the target RNC will soon be necessary, and the source RNC responsively (i) sends a signal to the target RNC to cause the target RNC to reserve radio resources for the data session, and (ii) sends a predictive handoff directive message to the wireless communication device,
wherein the predictive handoff directive message instructs the wireless communication device (i) to wait a designated period of time, and (ii) to then handoff, and
wherein the source RNC makes the prediction based at least in part on the determination.
2. A system comprising:
a source radio network controller (RNC);
a target RNC communicatively coupled with the source RNC;
a wireless communication device operable to establish a data session via the source RNC;
a first base transceiver station (BTS) communicatively coupled to the source RNC, wherein the first BTS provides a source pilot signal;
a second BTS communicatively coupled to the target RNC, wherein the second BTS provides a target pilot signal;
a processor at the source RNC; and
data storage at the source RNC, wherein the data storage includes a predictive threshold and program instructions executable by the processor,
wherein the wireless communication device is arranged to receive the source and target pilot signals and provide to the RNC an indication of (i) a strength of the source pilot signal received by the wireless communication device, and (ii) a strength of the target pilot signal received by the wireless communication device,
wherein the program instructions include instructions for (i) comparing a strength of the target pilot signal received at the wireless communication device to a strength of the source pilot signal received at the wire- less communication device, and (ii) making a determination that the strength of the target pilot signal received at the wireless communication device exceeds the strength of the source pilot signal received at the wireless communication device by at least the predictive threshold, wherein the source RNC makes a prediction that handoff of the data session to the target RNC will soon be necessary, and the source RNC responsively (i) sends a signal to the target RNC to cause the target RNC to reserve radio resources for the data session, and (ii) sends a predictive handoff directive message to the wireless communication device, wherein the predictive handoff directive message instructs the wireless communication device (i) to wait a designated period of time, and (ii) to then handoff, and wherein the source RNC makes the prediction based at least in part on the determination.

3. The system of claim 1, further comprising:
a first communication interface at the source RNC; and
a second communication interface at the target RNC,
wherein the signal comprises an Internet-Protocol (IP) based signal communicated from the first communication interface to the second communication interface, wherein the IP based signal includes information sufficient to allow the target RNC to reserve the radio resources for the data session.

4. The system of claim 3, wherein the IP based signal includes an IP address currently assigned to the wireless communication device.

5. The system of claim 1, wherein the radio resources include a traffic channel for carrying the data session.

6. The system of claim 1, wherein the radio resources include a time division multiplex (TDM) timeslot for carrying the data session.

7. A system comprising:
a base station system defining a first wireless coverage area and a second wireless coverage area;
a wireless communication device operable to communicate wirelessly with the base station system while in the first wireless coverage area and while in the second wireless coverage area;
an RNC controlling the base station system and providing connectivity between the base station system and a packet switched network, wherein the wireless communication device is operable to engage in packet data session via the base station system and the RNC;
a processor at the wireless communication device; and
data storage, at the wireless communication device, that includes a predictive threshold and program instructions executable by the processor,
wherein the base station system provides a source pilot signal for the first wireless coverage area and a target pilot signal for the second wireless coverage area,
wherein the wireless communication device is arranged to receive the source and target pilot signals,
wherein the program instructions include instructions for (i) comparing a strength of the target pilot signal received at the wireless communication device to a strength of the source pilot signal received at the wireless communication device, and (ii) making a determination whether the strength of the target pilot signal received at the wireless communication device exceeds the strength of the source pilot signal received at the wireless communication device by at least the predictive threshold, wherein the wireless communication device notifies the RNC of the determination, wherein the RNC is operable to predict that a handoff of the data session from the first wireless coverage area to the second wireless coverage area will soon be necessary, and to responsively (i) reserve target radio resources to carry the data session in the second wireless coverage area and (ii) send to the wireless communication device a predictive handoff directive message that instructs the wireless communication device to wait a designated period of time and to then handoff to the second wireless coverage area, and wherein the RNC predicts that handoff will soon be necessary based at least in part on the determination.

8. A system comprising:
a base station system defining a first wireless coverage area and a second wireless coverage area;
a wireless communication device operable to communicate wirelessly with the base station system while in the first wireless coverage area and while in the second wireless coverage area;
an RNC controlling the base station system and providing connectivity between the base station system and a packet switched network, wherein the wireless communication device is operable to engage in packet data session via the base station system and the RNC;
a processor at the RNC; and
data storage, at the RNC, that includes a predictive threshold and program instructions executable by the processor,
wherein the base station system provides (i) a source pilot signal for the first wireless coverage area, and (ii) a target pilot signal for the second wireless coverage area,
wherein the wireless communication device is arranged to receive the source and target pilot signals and provide to the RNC an indication of (i) a strength of the source pilot signal received by the wireless communication device, and (ii) a strength of the target pilot signal received by the wireless communication device,
wherein the program instructions include instructions for (i) comparing the strength of the target pilot signal received by the wireless communication device to the strength of the source pilot signal received by the wireless communication device, and (ii) making a determination whether the strength of the target pilot signal received by the wireless communication device exceeds the strength of the source pilot signal received by the wireless communication device by at least the predictive threshold, wherein the RNC is operable to predict that a handoff of the data session from the first wireless coverage area to the second wireless coverage area will soon be necessary, and to responsively (i) reserve target radio resources to carry the data session in the second wireless coverage area and (ii) send to the wireless communication device a predictive handoff directive message that instructs the wireless communication device to wait a designated period of time and to then handoff to the second wireless coverage area, and wherein the RNC predicts that handoff will soon be necessary based at least in part on the determination.

9. The system of claim 2, further comprising:
a first communication interface at the source RNC; and
a second communication interface at the target RNC,
wherein the signal comprises an Internet-Protocol (IP) based signal communicated from the first communication interface to the second communication interface, wherein the IP based signal includes information sufficient to allow the target RNC to reserve the radio resources for the data session.

10. The system of claim 2, wherein the IP based signal includes an IP address currently assigned to the wireless communication device.

11. The system of claim 2, wherein the radio resources include a traffic channel for carrying the data session.

12. The system of claim 2, wherein the radio resources include a time division multiplex (TDM) timeslot for carrying the data session.

* * * * *